United States Patent [19]

Atkins et al.

[11] 4,037,213

[45] July 19, 1977

[54] DATA PROCESSOR USING A FOUR SECTION INSTRUCTION FORMAT FOR CONTROL OF MULTI-OPERATION FUNCTIONS BY A SINGLE INSTRUCTION

[75] Inventors: James Damon Atkins, Chapel Hill; Charles Allen Murphy, Raleigh, both of N.C.; Lewis Everett Stotts, Kennesaw, Ga.

[73] Assignee: International Business Machines Corporation, Armonk, N.Y.

[21] Appl. No.: 679,583

[22] Filed: Apr. 23, 1976

[51] Int. Cl.$^2$ .............................................. G06F 9/00
[52] U.S. Cl. .................................................. 364/200
[58] Field of Search ............................ 340/172.5; 445/1

[56] References Cited

U.S. PATENT DOCUMENTS

| 3,226,691 | 12/1965 | Hazard | 340/172.5 |
| 3,331,056 | 7/1967 | Lethin et al. | 340/172.5 |
| 3,343,138 | 9/1967 | Ulrich | 340/172.5 |
| 3,522,589 | 8/1970 | Thron | 340/172.5 |
| 3,914,746 | 10/1975 | Steinmetz et al. | 340/172.5 |

*Primary Examiner*—Melvin B. Chapnick
*Attorney, Agent, or Firm*—Delbert C. Thomas

[57] ABSTRACT

A data processing machine specifically designed to use a single format of instructions for all operations. The format provides for sufficient information to be provided to enable complex functions to be performed in response to a single instruction. More particularly, a machine organization and an instruction format therefor are disclosed to enable one instruction to enter sufficient control data for control of a long repetitious operation. The instruction is in four sections to enable a function to be specified, to identify one or more operands to be utilized and to specify a number of times the function is to be performed or to specify another limit to the repetitions of the function.

3 Claims, 10 Drawing Figures

DATA PROCESSOR USING A FOUR SECTION INSTRUCTION FORMAT FOR CONTROL OF MULTI-OPERATION FUNCTIONS BY A SINGLE INSTRUCTION

BACKGROUND OF THE INVENTION

In the prior general purpose data processing machines, as for example, the System 360 and System 370 series of processors produced by the assignee of this patent application, instruction words were used in at least three lengths of one, two, or three half words depending upon the number of operands to be fetched or returned to main storage and each function to be performed was set out in a different instruction, depending upon whether the operands were to be found in two general purpose registers, one register and one address in main storage or two addresses in main storage. Such an instruction set required a large decoding section for the functions and a lot of duplication of gating circuits to control the data paths within the processor.

In the disclosed embodiment of a data processor, a single general purpose format is used for an instruction and such an instruction will be good for any combination of register or storage locations for the operands to be processed. Likewise, there need be only one set of operand address decoding devices for, at least, the major part of the instruction set and new processor functions may be built into the processor with the addition of only the function decoder and its associated connections to the circuit gates. The inclusion of a third operand section in the instruction also enables the single instruction to control the performance of functions heretofore requiring a plurality of instructions or some not normally available at all in a general purpose processor.

OBJECTS OF THE INVENTION

It is then an object of this invention to set out a new instruction format for a general purpose data processor and a new arrangement of processor circuits and gates operable in response to the entry of instructions in said format to perform comprehensive processing operations not previously performed in response to entry of a single instruction.

Another object of the invention is to disclose a format for instructions which will be substantially uniform for all instructions, thereby avoiding unnecessary multiplication of circuits in a processor.

Still another object is to disclose a format for instructions which can be used to control the performance of chained or sequential operations without adversely affecting the response characteristics of a multi-level interrupt driven implementation of this processor.

A further object is the disclosure of a processor operating under control of said instructions to perform the called for functions in a shorter time and with the expenditure of a fewer number of machine cycles than has heretofore been possible.

Other objects and features of the invention will be apparent in the following description together with appended drawings of a preferred embodiment of the invention.

DESCRIPTION OF THE DRAWINGS

In the drawings,

FIG. 2 is a showing of the manner in which FIGS. 2A and 2B are to be combined.

DESCRIPTION

Figures 1, 7:
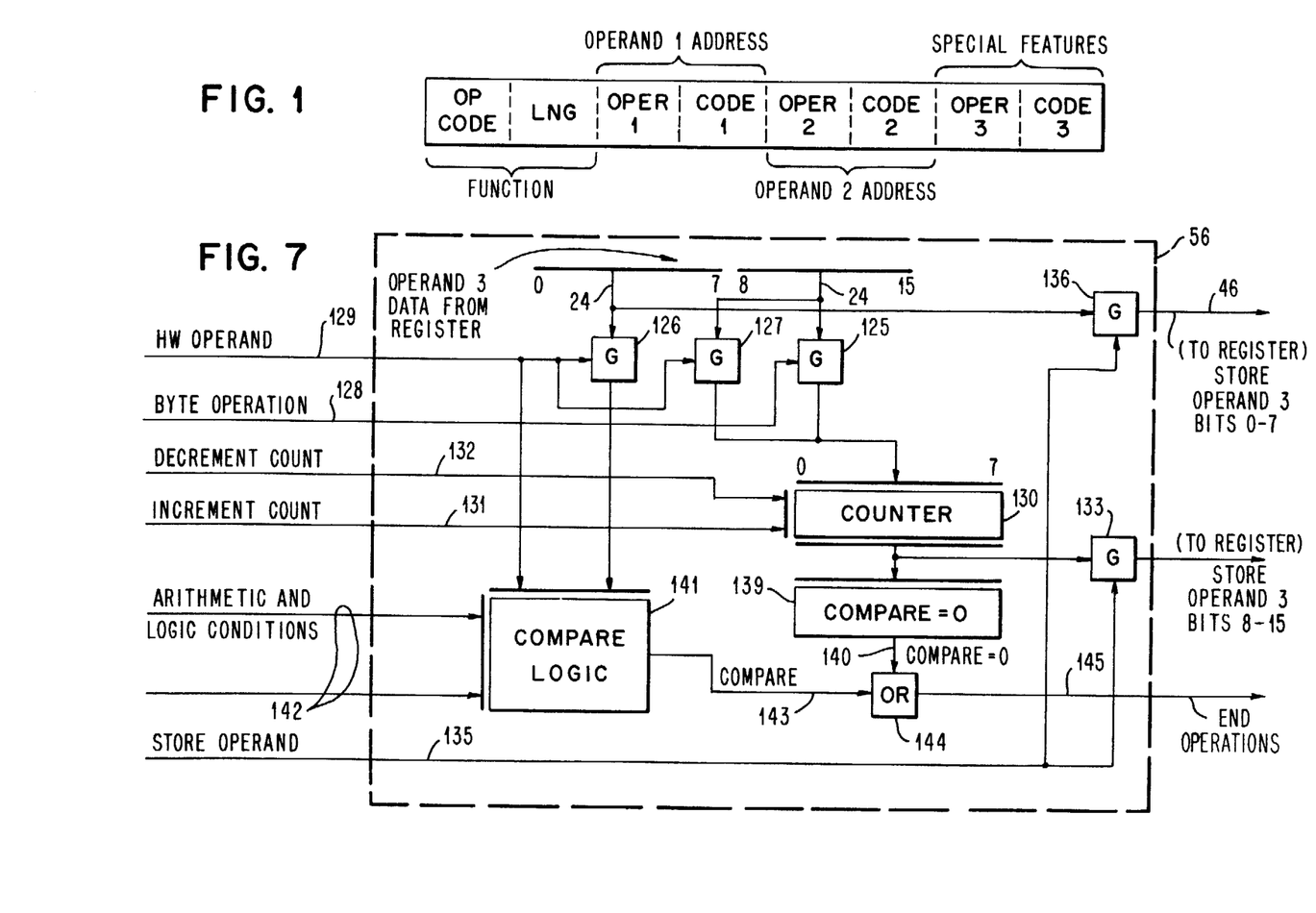
FIG. 1 is a representation of the general purpose instruction format of the invention.
FIG. 7 is a similar diagram for modifications in the operand for the special feature section.

The invention broadly relates to a new and more comprehensive instruction format for data processing machines and a reorganization of some of the circuits of the processor to realize the advantages of the instruction. The format of the instructions to be used is shown in FIG. 1 and will normally be of a whole word length. In this specification, the terms byte, half word, word and double word will be used to describe assemblies of eight, 16, 32, and 64 settable binary bits as is usual in the assignees' products and in EBCDIC (Extended Binary Coded Decimal Interchange Code) characters. Other length groups of binary bits have been used in data processors and obvious adjustments of the code and functions described herein may be made for such processors. In this format, the first byte length of the four bytes of the instruction will be for the generic function to be performed. The function may be, for example, an addition and will be performed without regard to the location of the operands in a register or in storage as has been required in earlier processors where as many as 12 different ADD instructions have been used. This function section will normally be six bits in length allowing up to 64 functions to be selected.

The other two bits of the first byte are used to designate the length of the data words to be operated upon in the performance of the function. These two bits will normally select operands of byte, half word or word lengths to maintain proper word boundaries. Double word length operands are not normally used in ordinary sized processors but could be selected for larger processors having wide data paths.

The second byte contains a five bit field to designate a general purpose register, a single bit field to specify whether the operand to be used from the register is a half word or a full word in length and two bits to designate whether the addressed register contains the operand data or contains the storage address of the operand and, if the address is stored in the register, whether the address is to be incremented or decremented. This format enables the same control over the operand whether the operand is stored in the addressed register or whether it is in the storage area.

The third byte is identical in format to the second byte and will control selection of the second operand in the same manner as the first operand is used. Thus the same instruction and the same machine controls can be used for any combination of register and storage located operands as contrasted to previous machine types which used at least three separate commands and instruction formats for the same functions.

The last byte may contain information to control and terminate iterative processing. It will contain a five bit field which specifies the address of a register containing the count for iterative operations. The next two bits specify whether the count in the counter is to be retained or if it is to be incremented or decremented and the last bit of the byte specifies whether additional termination conditions are specified. This last bit will determine the use of the addressed register as a short register of eight bits containing the count of the iterations to be performed or as a half word register where the additional second byte will contain a mask part of seven bits to allow selected ones of the machine condition code settings to also be sensed to determine if a termination is to take place. A last bit of this second byte further extends the function of the mask to cause termination to be called for on either a set or unset condition of the selected machine condition codes.

This last byte of the instruction format enables the processor to perform long and involved operations. Examples of the use of the count field addressing would be an instruction calling for the function of the addition of a string of many first operands addressed by a first register to a corresponding string of second operands addressed by a second register with the number of operations stored in the register designated by the third operand field. The multiple operands are from contiguous storage locations and can be of a selected number of bytes. Either operand can be a constant value read from either a register or storage location by setting the address register for non-decrementing and for non-incrementing. If desired the iterative operand addresses can be set to proceed in the same or opposite directions through the memory addresses. These operand variations require no changes in the machine operating controls and are determined by the operating parameters set into the instruction by the programmer.

The use of a long register with a part of the stored data used for masking of some condition codes enables improvement in the performance of more complex operations. Consider the example of a compare operation where one operand either a constant or a string of operands) is to be compared operand by operand, with another operand string. The counter part of the third operand register will be set to terminate the operations at the end of the strings but the operations can also be terminated by either an equality or non-equality between the operands. In a mathematical operation between strings of operands, the condition codes and masks can be set to stop the operations on the occurrence of a zero, non zero, positive, or negative result or some other testable condition.

Another operation which can not be easily performed on prior processors and sometimes not performed at all would be the shifting of variable length operands a number of bit positions to either the right or left. For this function, the register selected by the third instruction byte would be set to the number of operations required to process the full length of the operand string. Then starting at the right end for a left shift or the left end for a right shift, the operand words are shifted and restored to their original storage location with the bits shifted out being retained in the second operand register. When the next operand word is read out and shifted, these retained bits are inserted into the vacated bit positions of the word and this sequence is repeated until the last operand word has been processed. Any data bits retained at the end may now be discarded unless the operation was "rotate" rather than "shift" in which operation the retained bits are entered into the vacant positions of the first operand word. It should be noted that in those operations where operands are modified in processing, the resultant operand will, if it is to be retained in modified form, be returned to the location from which the first operand was obtained.

From the above description, it will be evident that the use of instructions in the present format allows the specification by a programmer of a large number of operating parameters and that many different functions and series of operations can be specified in a single instruction. It will also be evident that the feature of allowing the programmer to set the operating parameters allows the machine's function decoders to be substantially reduced in number and complexity and also allows a group of related new functions to be added to the processor by building in only one new decoding circuit. Other advantages in scope and use of instructions written in the above format will be obvious to users of the instruction format.

DESCRIPTION OF LOGIC

The logic necessary in a data processor to utilize the above instruction format will be described in a preferred embodiment of the new assemblies needed in an otherwise conventional data processor. As indicated in the combined diagram of FIGS. 2A and 2B, the general system is comprised of a block of storage locations assembled in a memory 11 (FIG. 2A). Data may be written into a storage location or read out therefrom into a memory data register 12 under control of an address in a storage location address register 13 which will also include controls to select either a half or full word address register for the operation and either a read or write operation. As is usual in data processors, the memory address register may be loaded to select the storage location of an instruction through gates 14 and 15, FIG. 2B from an instruction address counter 18 or with the storage location address of an operand through gates 19 and 14 from a selected one of a group 20 of general purpose registers. A two way gate 21, FIG. 2A, is provided to enable the general purpose registers 20 to be loaded from or unloaded to the main memory 11. A bus 24 interconnecting gates 14, 15, 19, 21 and 22 serves to transmit information between the units.

A gate 28, FIG. 2A, connects the memory data register 12 to an instruction register 29 and is enabled to pass new instructions addressed by counter 18 into register 29 for buffering and decoding. Each byte of information in instruction register 29 is passed into a decoder 30, 31, 32, or 33, and all decoders connect into a sequential logic 35 for instructions. This sequential logic 35 will operate as is conventional in data processors, to control the data transfer gates as required by the function part of the first byte. Further description of the sequencing unit is believed unnecessary as such a unit is conventional, being used in all data processors, and is a group of differently connected and/or circuits with a clock for sequencing. The other operands from the second, third and fourth bytes of the instruction, as well as the remaining operand length bite from the first byte, will be gated through the logic unit 35 to either bus 24 or to an arithmetic logic unit 36 over a bus 38. The condition codes mentioned above may be returned to the sequencing logic over a bus 39 for comparison with the mask in the register selected by the last instruction byte to determine if the operation is to be terminated.

Figure 2:
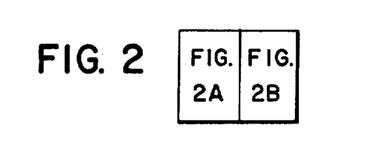
Figure 2A:
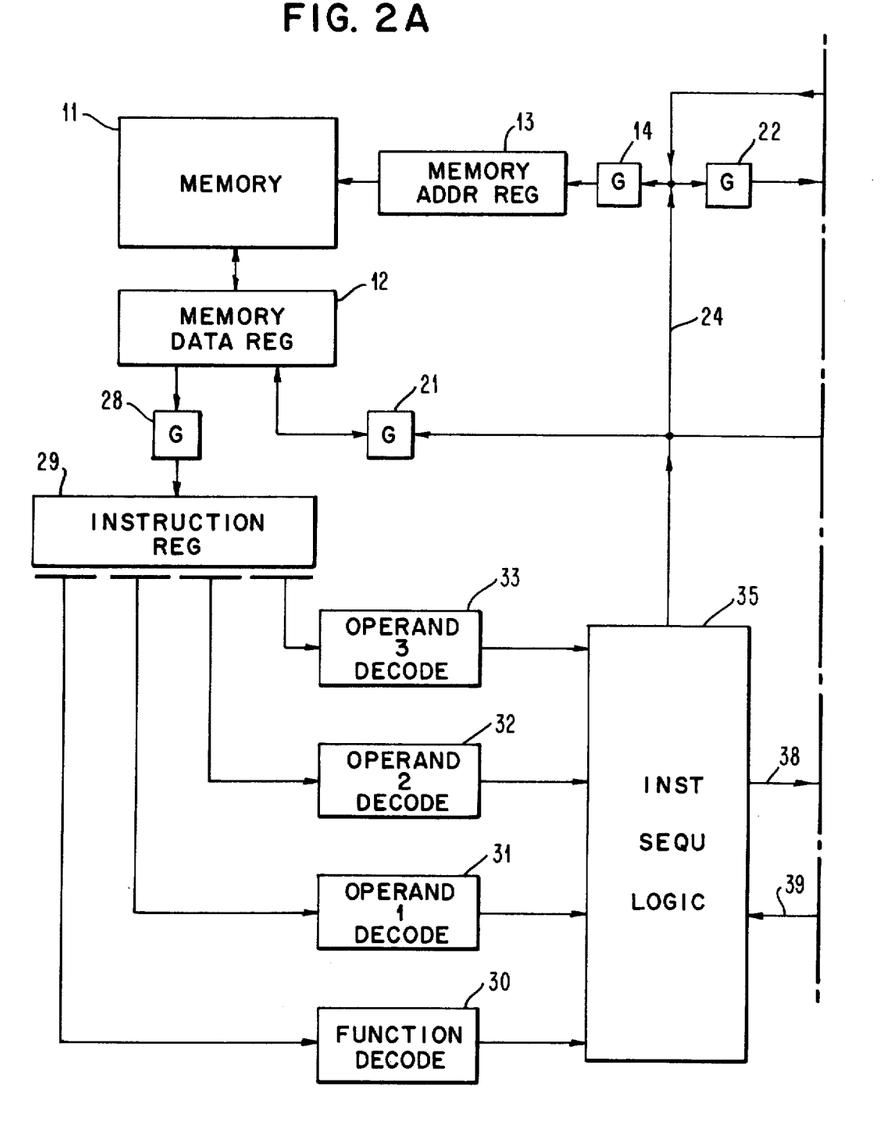
FIGS. 2A and 2B, combined as shown in FIG. 2 is a block diagram of a processor using the described instructions.
Figure 2B:
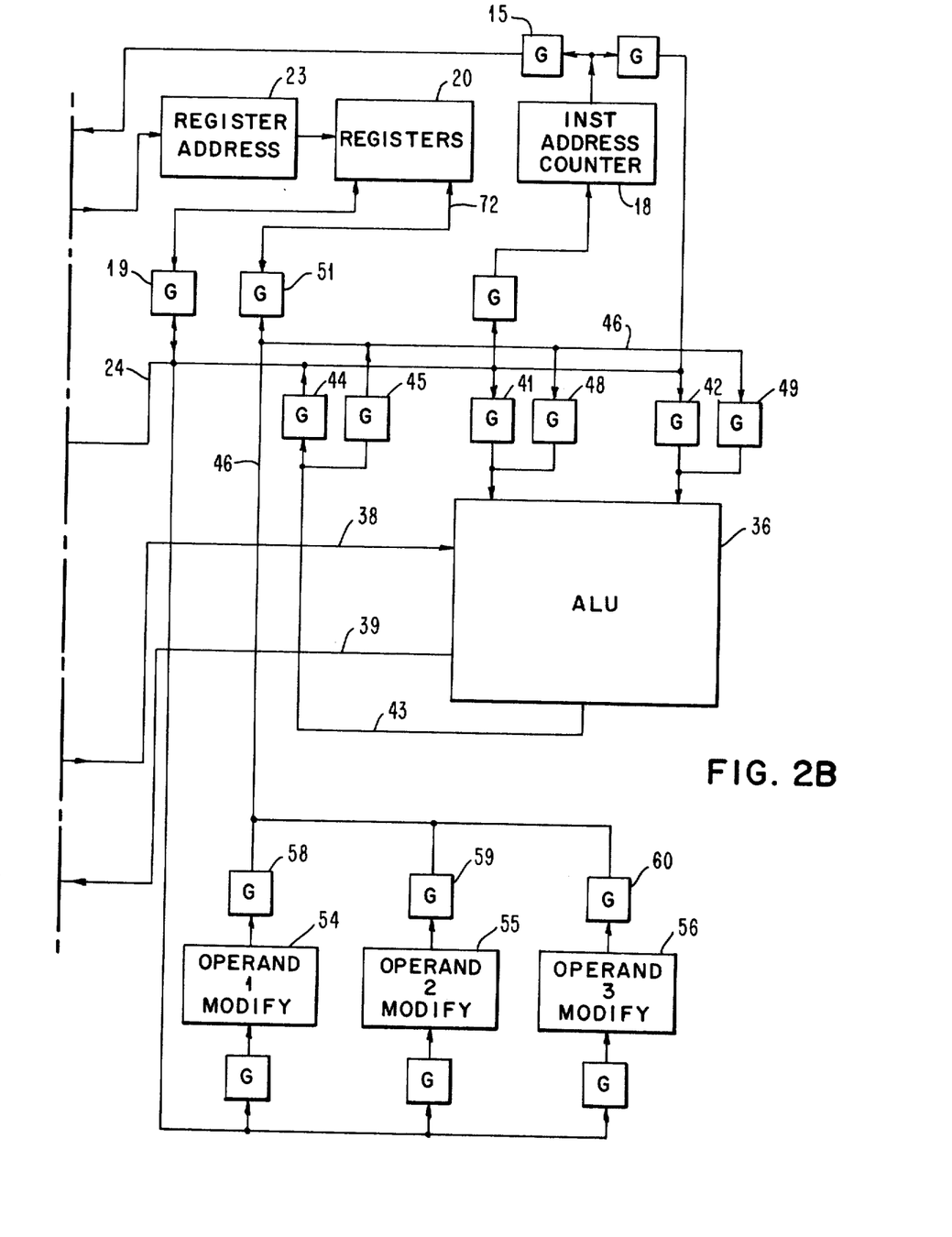

The arithmetic logic unit (ALU), FIG. 2B, receives the operands to be processed over bus 24 from either memory 11 or one of the registers of group 20 and passes them through gates 41 and 42 into the input buffer registers of the ALU 36. The output of ALU 36 is gated from output bus 43 through gates 44 and 45 to bus 24 or to an address bus 46 respectively. Gates 48 and 49 from bus 46 to the operand inputs of ALU 36 feed operands from the register 20 through gate 51 for processing. The modification of the operand addresses stored in the registers 20 and referenced in the description of the first and second operand bytes of the instruction is performed by the modify units 54 and 55. These units are controlled by the operand length input from the first byte and by the code bits from the associated second or third byte to generate the address of the next operand and return it through gates 58 and 59 to bus 46 for storage in its register of the group of registers 20. The modify unit 56 receives the count value from the register 20 selected by the third operand with the control information to keep track of the count and to terminate processing when the count reaches a zero value. An updated count value will be returned through gate 60 to bus 46 for restoration to the count register of registers 20.

Figure 3:
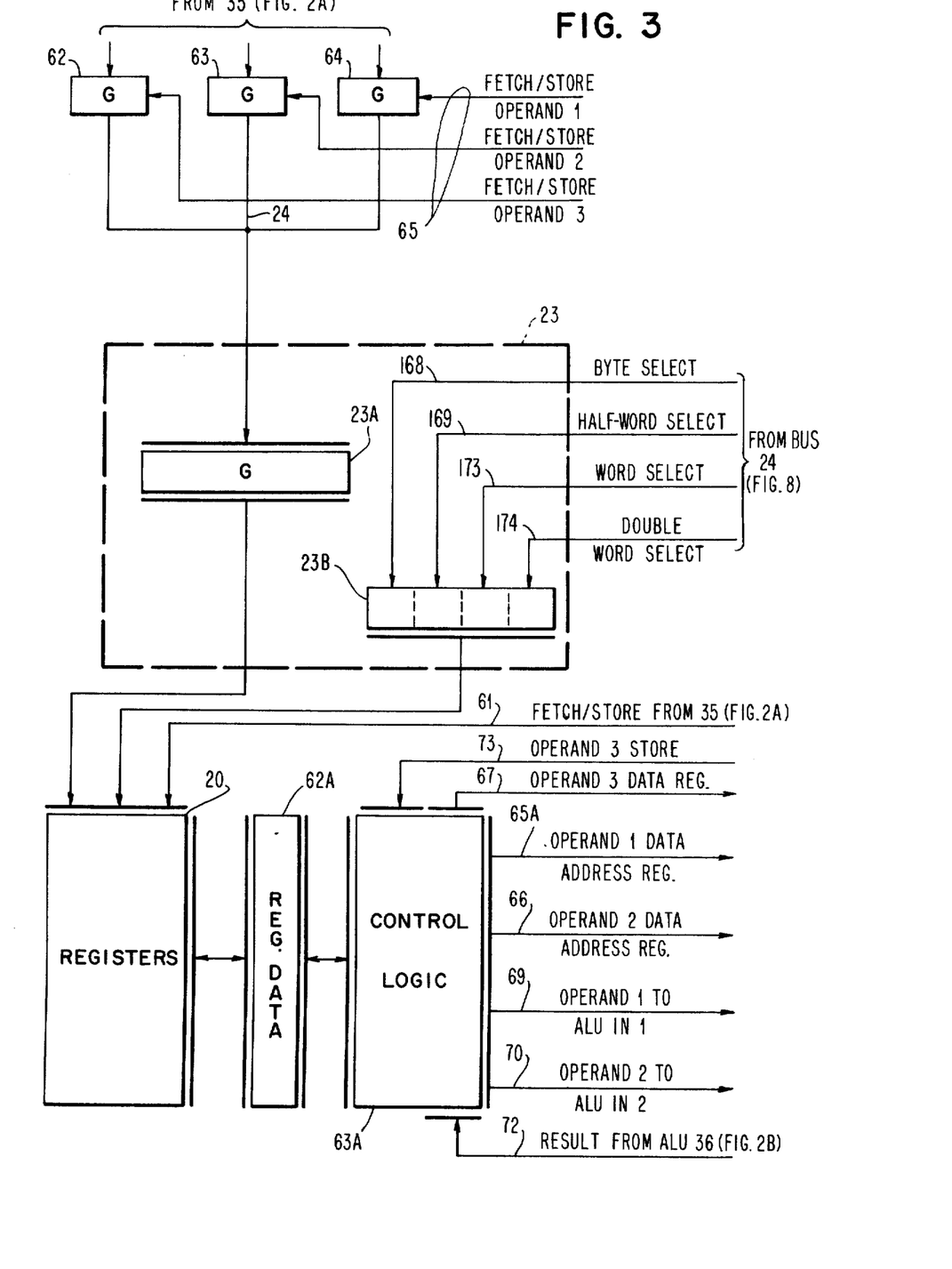
FIG. 3 is a diagrammatic showing of the operand addressing devices.

FIG. 3 is a more detailed showing of the controls for the group of registers 20 of FIG. 2. In this figure, the address of the selected register will be gated from the operand decoders 31, 32, or 33 through the instruction sequencing logic 35 to bus 24 and into the register address register 23. The actual address of the low order byte of the selected register will be stored in the buffer 23A while the length of the data word being selected as derived in logic 35 from the length field of the first byte of the instruction will be entered from lines 168, 169, 173 and 174 forming a part of bus 24 into a storage buffer 23B and a fetch or store control line 61 also a part of bus 24 will be energized to set the function to be performed. The gates 62, 63, and 64 are selectively energized by lines 65 from the instruction sequencing logic 35 to pass the register address to be used for the selected operand into the buffer 23A.

The register selected by the address register 23 will store data from or feed data to the general register data register 62A as called for by the signal on line 61. From the data register 62A, the information will be distributed by the control logic 63A to the operand address busses 65A, 66, or 67 for indirectly addressed operands or to busses 69 and 70 for gating to bus 24 to the inputs to ALU 36. The result of the operation in ALU 36 is returned to control logic 63A on a bus 72 for entry into the general purpose register 20 selected for operand 1. Operand 3, the updated count data, will be transmitted from bus 73 for gating by the control logic back into the register 20 for the third operand data.

Figure 4:
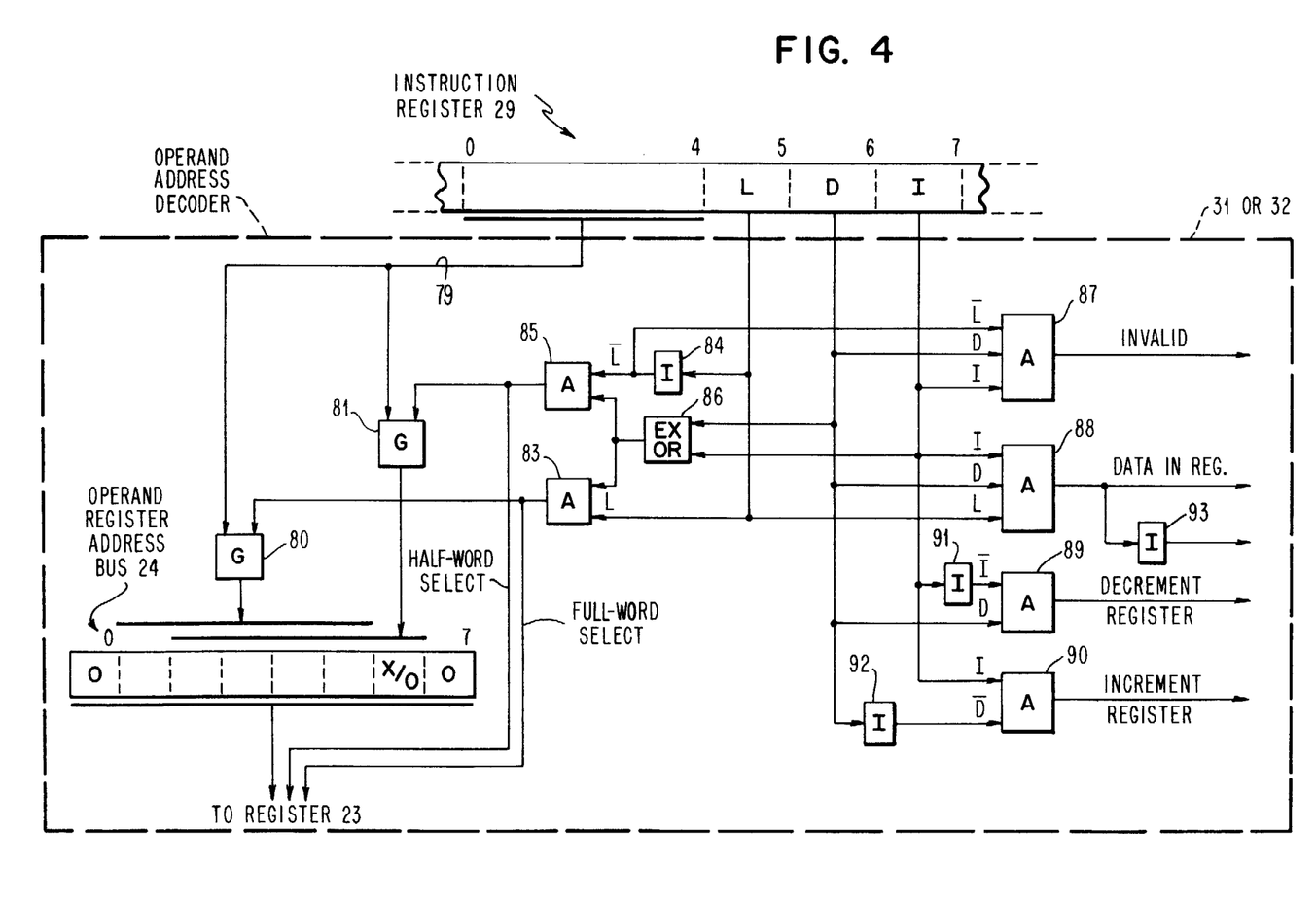
FIG. 4 is the decoding mechanism for the first and second operands.

FIG. 4 shows a specific embodiment for each of the operand decoders 31 and 32 of FIG. 2A. The operand information is that in the associated byte of the instruction register 29. The five register address bits are gated from bus 79 to either bit positions 1-5 of bus 24 by a gate 80 or alternatively into bit positions 2-6 of the bus by a gate 81. Selection of gate 80 or 81 is determined by the data set into bit positions 5 to 7 of the byte. The bit in position 5, the length bit, is an input of an And circuit 83 and is inverted in an inverter 84 and applied as an input to another And circuit 85. And 83 controls gate 80 while And 85 controls gate 81. The other input of Ands 83 and 85 are from an Exclusive OR 86 receiving data bits from bit positions 6 and 7 of the byte in register 29 and whose output will indicate that the selected register data will be modified in the related modifier circuit 54 or 55 so that the operand address will be required. The output of Ands 83 and 85 are transmitted on bus 24 to register 23 as the full word select and half word select lines respectively.

The outputs of bit positions 5, 6, and 7 are also combined in a group of Ands 87 to 90 whose outputs are control signals for that operand. And 87 receives the inverted bit 5 from inverter 84, and 6 and 7 and if all these bits are present, will give an output signal that the operand is invalid. And 88 receives all bits 5 to 7 directly and if the bits are all set, it will give an output indicating that the data in the addressed register is the operand to be used. The output of And 88 is used to control the gates 48 and 49 of FIG. 2B to pass operands from the register 20 over bus 46 to the inputs of ALU 36 or if there is no output, then the output of an inverter 93 is effective to control gates 41 and 42 to pass operands on bus 24 from storage to the inputs of the ALU. And 89 controls the decrementing in the associated modifier 54 or 55 and will have an output when bit 6 is present and inverter 91 does not receive a bit present signal from bit 7. And 90 controls incrementing in the modifier 54 or 55 and will give an output when bit 7 has been set and its inverter 92 does not receive a bit present signal from bit position 6.

Figure 5:
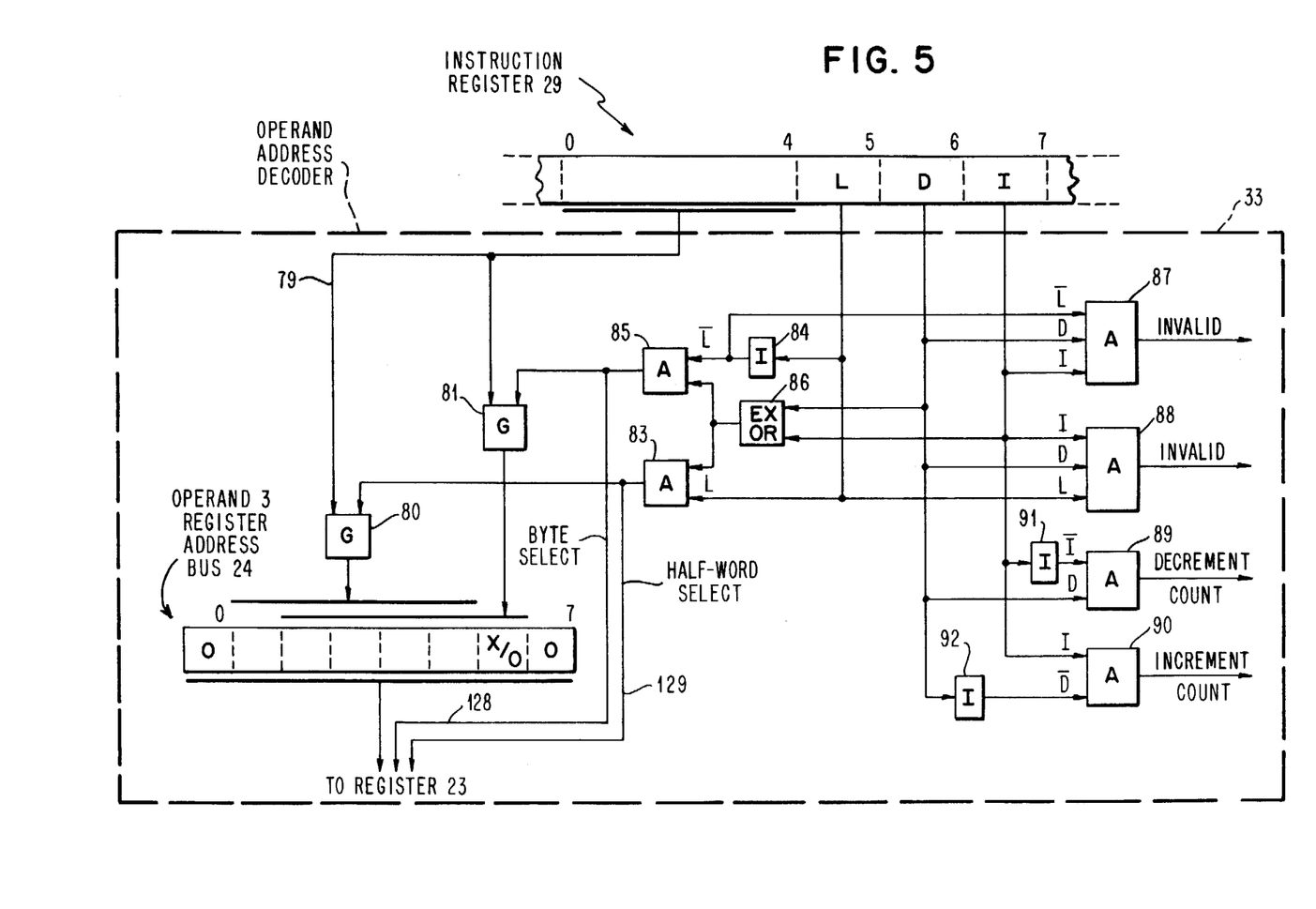
FIG. 5 is the decoding mechanism for the third operand for special features.

FIG. 5 is the schematic diagram for the corresponding decoder 23 for the third operand. It is identical in internal hardware to the decoder 31 above described and the internal parts have been given the same reference numerals. The differences are that the outputs of Ands 83 and 85 are now used to select either a half word or a byte rather than a full word or a half word as in decoder 31. And 88 is modified to indicate an invalid code. Also the designations of Ands 89 and 90 are modified to indicate a decrementing of the count value of operand 3 or an incrementing of the count value respectively.

Figure 6:
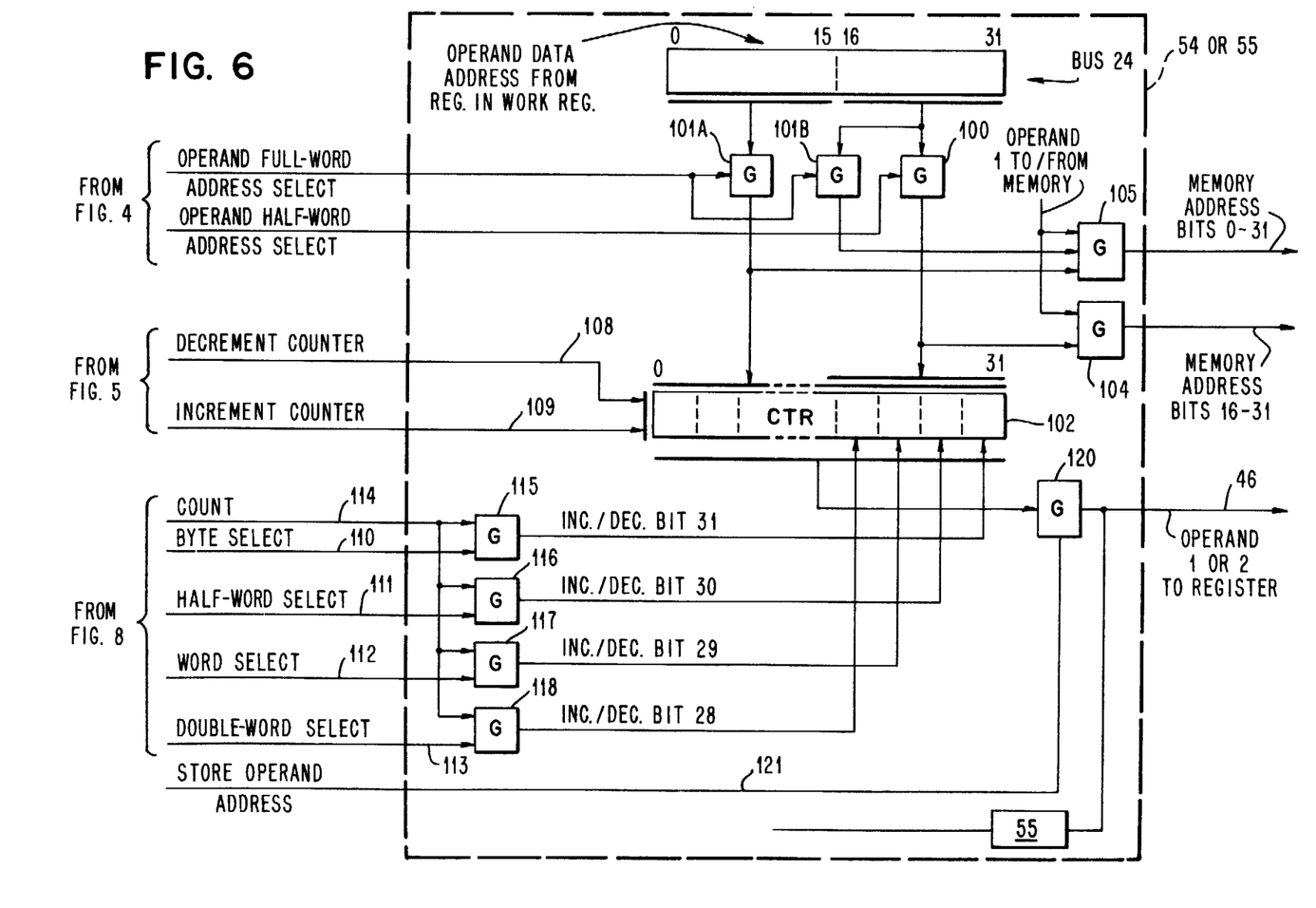
FIG. 6 is a schematic showing of the address modification device for the addresses of operands one and two.

FIG. 6 is a diagram of the address modification circuits 54 for the operand 1. The address of the operand 1 to be used in an iteration of an instruction is stored in one of the work registers and is selected by the instruction byte for the operand. The address of the next operand will be that address as incremented or decremented by the length in bytes of the operand. As indicated, when an operand address is present on bus 24, either the lower half word is gated through gate 100 or the full word is gated through gates 101A and 101B to transfer the address into a counter 102. The address is also passed through a related gate 104 or 105 to be gated into the memory address register 13 to read the addressed operand.

The counter 102 is capable of being decremented or incremented under control of signals on lines 108 and 109 from And circuits 89 and 90, FIG. 4. Since the amount by which the data in counter 102 is to be modified depends on the length of the associated operand, one of the lines 110 to 113 is energized to indicate the operand length, either a byte length on line 110, a half word length on line 111, a full word length on line 112, or a double word length on line 113. The signal on the energized line will be gated through the associated gate 115 to 118 by a signal on the count line 114 (from 93 of FIG. 4) to cause modification of counter 102. The outputs of gates 115 to 118 are inputs to bit positions 31, 30, 29, and 28 respectively and modify the stored address by 1, 2, 4, or 8 byte addresses respectively. After the address in counter 102 has been modified, it is gated out through gate 120 by a gating signal on line 121 to bus 46 for reentry into the operand 1 register of the group 20. A second connection to bus 46 comes the modifier 55 for the second operand.

FIG. 7 shows the operating logic 56 for the third operand. Here the operand 3 data from bus 24 has the count part of its data gated through gate 125 for a byte operand (i.e., without a specified condition mask) indicated by a signal on line 128 from And 85, FIG. 5 or through gate 127 for a half word operand (i.e., with mask condition) and indicated by a signal on line 129 from the And 83 of FIG. 5. The count part of the operand is entered into a counter 130 where it may be incremented or decremented by a signal on either line 131 or line 132 from Ands 90 and 89, FIG. 5, respectively. The updated counter value may be gated out through a gate 133 to bus 46 by a store operand signal or control line 135. At the same time, the higher order byte of data on bus 24 is gated by the signal on line 135 through gate 136 to another section of bus 46 for storage back into the operand 3 register 20.

To terminate processing resulting from an instruction, a compare circuit 139 receives the output of counter 130 and will signal on its output line 140 when the count is zero. To terminate the operation when a preset condition is met, the higher order byte of the operand is gated from bus 24 through gate 126 by the signal on line 129 into a compare logic block 141. Here the conventional condition code representing the results of an operation on the operands is received on lines 142 from ALU 39 and is compared with the conditions set in the high order byte of the third operand. A signal is given on line 143 when the set conditions are found. An OR circuit 144 combines the signals on lines 140 and 143 to provide an end operation signal on line 145 when an ending condition is found.

Figure 8:
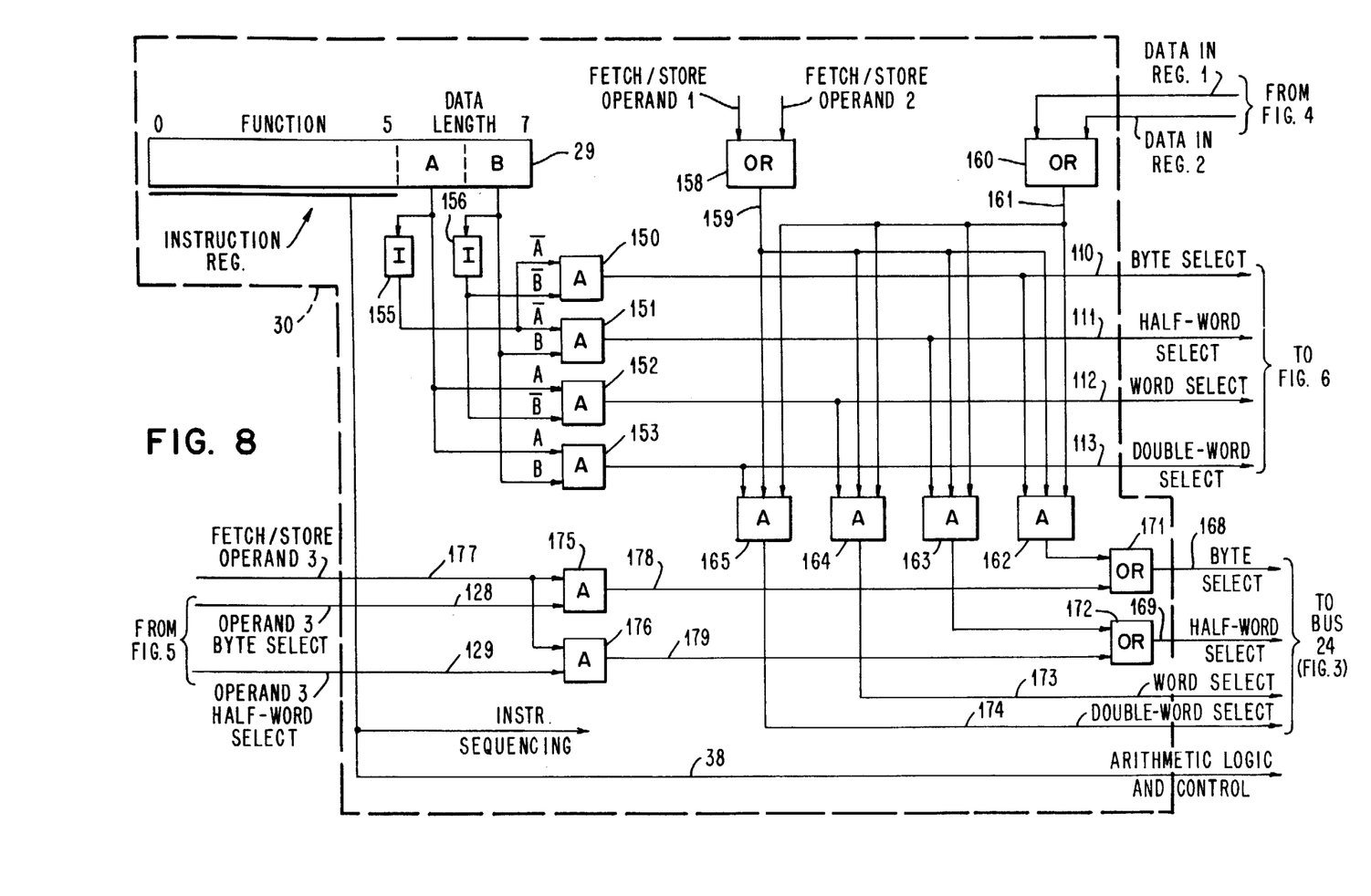
FIG. 8 is the decoding and selecting circuits for the data length control.

FIG. 8 is the structure associated with the function decoder 30 for setting the operand length controls. The first instruction byte in the instruction register 29 is for function control. As shown, the high order function bits are passed directly to the instruction sequencing logic 35 and to ALU 36 for a conventional type control over the system operations. The two low order bits are decoded by four And gates 150 to 153. And 150 receives the inverse of the setting of the A bit in bit position 6 through inverter 155 and the inverse of the setting of the B bit in bit position 7 through the inverter 156 and will put an output signal on line 110 when both the A and B bits are zero. And 151 receives the inverse of the A bit from inverter 155 but is connected to receive the B bit directly from bit position 7 and it will put a signal on its output line 111 for a 01 setting of the A and B bits. And 152 receives the A bit setting directly but gets the inverse of the B bit from inverter 156 to energize its output line 112 when the A, B bits are set to a 10 condition. The And 153 receives both the A and B bits directly from instruction register 29 and will put an output signal on line 113 for an AB setting of 11.

The operand length signals are also sent to the group of general purpose registers over bus 24. An OR circuit 158 receives both the fetch or store signals for both operands 1 and 2 and will energize its output line 159 when either condition occurs for either operand. Another OR circuit 160 receives the data in register signals from Ands 88 for the two operands, see FIG. 4, and will energize its output line 161 when either input line is made active. A group of Ands 162 to 165 each receive the signals on lines 159 and 161 and each receives one of the length output signals from the associated one of the Ands 150 to 153 to energize the operand length select lines 168 and 169 through OR circuits 171 and 172 respectively and select lines 173 and 174 directly. Lines 168, 169, 173 and 174 are also part of bus 24 and set the registers 20 and memory 11 to the length of the operand to be used, see FIG. 3. For control of the register for the third operand, the byte select line 128 and the half word select line 129, see FIG. 5, have their signals gated through Ands 175 and 176 when a fetch or store operation is being performed for operand 3 as indicated by a signal on line 177. The outputs of gates 175 and 176 are connected over lines 178 and 179 to other inputs of OR circuits 171 and 172 to provide operand length controls when operand 3 is being utilized.

From the foregoing description of the preferred embodiment it will be seen that the embodiment is capable of being controlled by a single instruction to perform long and complex sequences of operation on a sequence of one or more operands stored in adjacent storage locations. Many modifications of the described structure can be devised to carry out the benefits resulting from the use of instructions in the general purpose instruction format described herein with such modified structures still utilizing the distinctive features of this invention as set out in the appended claims.

What is claimed is:

1. In a data processor of the type having a storage device comprising a plurality of addressable storage locations for retaining instructions and operands and a plurality of registers for storing the addresses of operands stored in said device, the combination of
   a multi-section instruction register connected to receive an instruction from said storage device for control of said processor, said instruction including a first part to identify the function to be performed by said processor, a second part to specify the lengths of the operands to be processed, a third and a fourth part to identify two of said registers storing operand addresses, a fifth part and a sixth part of said instruction, each associated with one of said third and fourth parts to control modification of the address data in said identified operand address registers and a last part to identify still another one of said operand address storing registers containing operation terminating conditions,
   a plurality of decoders, one connected to each section of said instruction register and settable in accordance with the operand length data stored in the second part of said multi-section instruction register,
   an instruction sequencing unit connected to the decoder for said first part of said instruction and operating to control the functions of said data processor,
   means connected to said decoders for said third and said fourth parts of said instruction to select said two registers to determine the storage locations of a pair of operands,
   an address modification unit for each of said identified operand address registers and for said identified register containing operand terminating conditions, said modification units for said operand address registers being connected to transfer address data to and from the associated one of said registers, and control connections from each of said decoders for said fifth, sixth, and last parts of said instruction register to the associated one of said modification units to determine the modification to be performed therein.

2. In a data processing system having an information storage area for holding words of information in addressable storage locations, a plurality of general purpose data storage registers, and a sequencing logic unit controlling transfer of information to and from both said storage locations of said storage area and said data storage registers, the combination of:

an instruction register and connections therefor to receive a multipart instruction word from one of said storage locations of said storage area, each instruction word including a function part to control said sequencing logic unit, a length part to indicate the length of operands to be processed, two operand parts, each part to identify both one of said data storage registers and a modification function to be performed on the data in said identified data storage register, and a last part to specify the address of another data storage register and a type of modification of the data therein, said last part also specifying at least one condition for a termination of the data processing by said instruction word, a decoding device for each part of said instruction word in said instruction register, each decoding device being connected to the part of said instruction register storing the associated part of said instruction word and having outputs settable in accordance with the information of its instruction word part, a data modifier controlled by each of said decoding devices for the two operand parts of said instruction word parts and also controlled by the decoder for the length field of said length part, connections from each of said data modifiers to said storage registers to transfer the data stored in the identified ones of said registers to said modifier for modification in accordance with said length part of said instruction word and the modification function of the associated part of said instruction word, and a modifier unit for said last part of said instruction word, said modifier unit being connected to said data processing system to receive condition data therefrom, to modify said data as required by said last part of said instruction word and to signal for a termination of data processing when a specified termination condition is detected in said condition data.

3. In a data processing system having an information storage with addressable storage locations for retaining data operands and instruction words, a storage address register therefor, a plurality of general purpose registers for retaining the storage location addresses of operands, a processing unit to process pairs of operands and a sequencing unit to sequentially actuate said storage, all said registers and said processing unit, the combination of:

an instruction register connected to said information storage to receive and retain an instruction word from said storage, a function decoder connected to a first part of said instruction register and generating outputs in accordance with the setting of said part to control said sequencing unit, a pair of operand decoders connected to a second and to a third part of said instruction register respectively, each operand decoder having outputs set in accordance with the data held in the associated part of said instruction register to select one of said general purpose registers to identify the address of the storage location holding an operand, a pair of operand modifier units, each connected to and under control of an associated one of said operand decoders and each connected to and under control of a part of said function decoder to modify the address data in the one of said general purpose registers selected by its operand decoder, a termination control decoder connected to a last part of said instruction register and having outputs set in accordance with the data in said last part to select another of said general purpose registers, said general purpose registers having data stored therein to identify an operation terminating condition, and a termination control modifier connectable to said termination control decoder and to said other general purpose register to receive data therefrom, to modify said received data in accordance with information stored in said last part of said instruction register and to signal the occurrence of a termination indicating combination in said received data.

* * * * *